United States Patent [19]

Schmidt

[11] Patent Number: 4,759,707

[45] Date of Patent: Jul. 26, 1988

[54] PRESS FOR THE PREPARATION OF PLASTIC BLANKS

[75] Inventor: Willy Schmidt, Marktredwitz, Fed. Rep. of Germany

[73] Assignee: Hoechst CeramTec Aktiengesellschaft, Selb, Fed. Rep. of Germany

[21] Appl. No.: 737,870

[22] Filed: Jun. 21, 1985

Related U.S. Application Data

[63] Continuation-in-part of Ser. No. 620,252, Jun. 13, 1984, abandoned.

[30] Foreign Application Priority Data

Jul. 27, 1983 [DE] Fed. Rep. of Germany ....... 3327115

[51] Int. Cl.⁴ ............................................ B29C 47/36

[52] U.S. Cl. ............................... 425/376 B; 100/177; 417/203; 418/178; 418/255; 418/266; 425/405.1; 425/DIG. 6

[58] Field of Search ........................ 417/203; 100/177; 418/255, 178, 266; 425/DIG. 60, 376 R, 405 R, 409, 405.1, 376 B; 222/252

[56] References Cited

U.S. PATENT DOCUMENTS

| | | | |
|---|---|---|---|
| 947,013 | 1/1910 | Dowd | 100/177 |
| 1,000,371 | 8/1911 | Brickley | 418/255 |
| 1,848,754 | 3/1932 | Lanzerotti-Spina | 418/255 |
| 2,046,873 | 7/1936 | Garrison | 418/255 |
| 2,125,283 | 8/1938 | Campbell | 417/203 |
| 2,352,941 | 7/1944 | Curtis | 418/255 |
| 2,353,965 | 7/1944 | Meador | 418/255 |
| 2,617,167 | 11/1952 | Johnson | 425/DIG. 60 |
| 3,954,358 | 5/1976 | Normandin | 418/255 |
| 3,964,447 | 6/1976 | Normandin | 418/255 |
| 4,385,873 | 5/1983 | Richter | 418/255 |
| 4,432,711 | 2/1984 | Tsuchiya et al. | 418/255 |
| 4,465,445 | 8/1984 | Sommer | 418/255 |

FOREIGN PATENT DOCUMENTS

| | | | |
|---|---|---|---|
| 171807 | 12/1951 | Austria | 222/252 |
| 645239 | 7/1962 | Canada | 418/178 |
| 5009 | 1/1889 | Fed. Rep. of Germany . | |
| 1019964 | 11/1957 | Fed. Rep. of Germany . | |
| 1229279 | 11/1966 | Fed. Rep. of Germany . | |
| 2227525 | 11/1973 | Fed. Rep. of Germany . | |
| 3130676 | 2/1983 | Fed. Rep. of Germany . | |
| 586263 | 3/1925 | France | 100/177 |
| 602838 | 3/1960 | Italy | 418/255 |
| 646192 | 9/1962 | Italy | 417/203 |
| 58-67989 | 4/1983 | Japan | 418/178 |
| 147091 | 3/1931 | Switzerland | 100/177 |
| 334552 | 1/1959 | Switzerland . | |
| 12667 | of 1906 | United Kingdom | 418/255 |

*Primary Examiner*—Willard E. Hoag

*Attorney, Agent, or Firm*—Foley & Lardner, Schwartz, Jeffery, Schwaab, Mack, Blumenthal & Evans

[57] ABSTRACT

A press for the preparation of raw plastic material blanks is described. It has a feed device connected to a rotor housing in which a circular rotor is eccentrically supported for the generation of pressure and the transport of the material. Rotor housing and rotor form a tapering channel. The circular rotor has at least one axially extending material transport ridge forcibly guided along a guide rail located in the rotor housing. At its smaller end the tapering channel forms an extrusion gap which opens into an outlet opening for the plastic material, to which a nozzle is attached.

17 Claims, 2 Drawing Sheets

FIG. 1
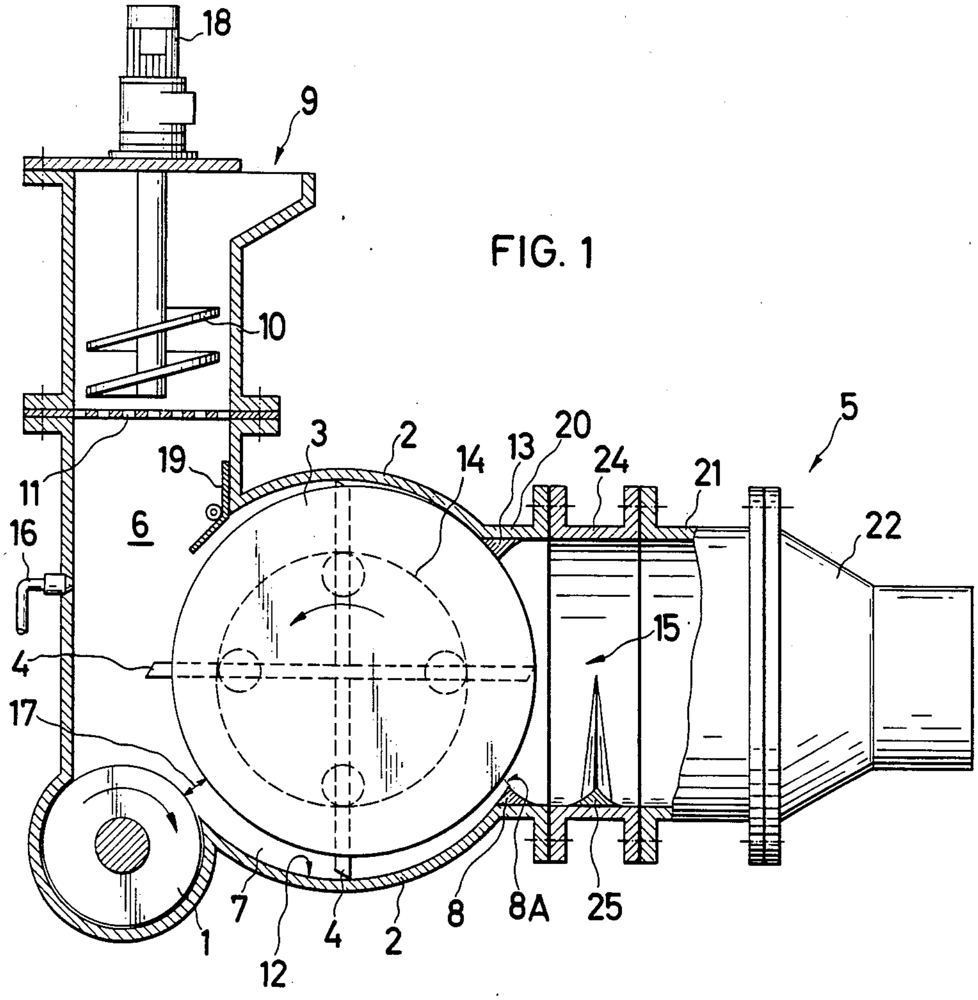
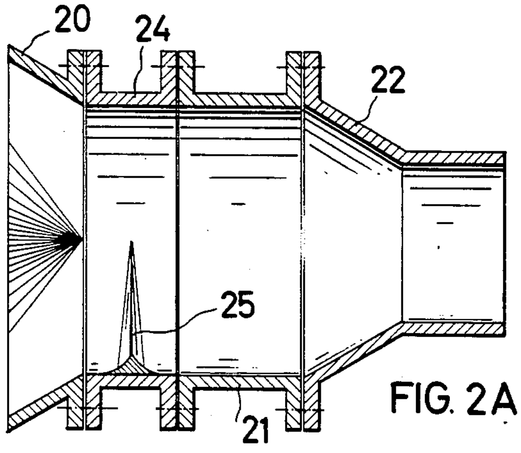
FIG. 2A
FIG. 2B
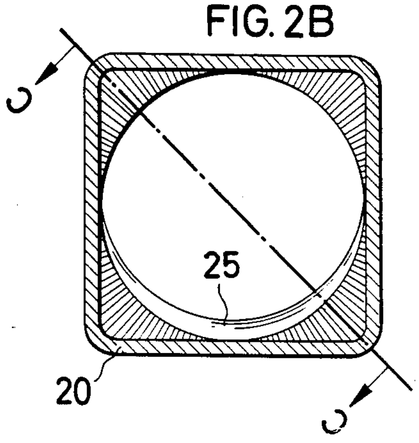

PRESS FOR THE PREPARATION OF PLASTIC BLANKS

This application is a continuation-in-part-application of co-pending application Ser. No. 620,252 filed June 13, 1984 by Schmidt and now abandoned.

BACKGROUND OF THE INVENTION

The present invention relates to a press for the production of plastic blanks, particularly unfinished ceramic shapes for insulators, and more especially, a press having a feed installation.

Presses of the aforementioned type are known. Even though much effort has been expended, even to this day screw presses are the most frequently employed tools for the shaping of plastic materials, such as those used, for example, in the ceramic industry or in the building material industry in brick plants. See, Sprechsaal, Vol. 116, No. 1, 1983, Fachberichte, page 25 et seq. These presses, also known as extrusion presses, have always been criticized, since all types of screw presses are burdened by a number of disadvantages, which are unacceptable depending upon the particular application range of a given press. This state of the art has already been described in Swiss Patent No. 33 45 52 and the principal disadvantages, which still exist, are listed therein.

A possibility of obtaining satisfactory pressing results, while simultaneously avoiding the negative accompanying phenomena of screw presses, is offered by a press which has become known in about 1972 as the screwless extrusion press. This press employs a roll-shaped conveying member, the so-called rotor. This roll shaped conveying member is equipped over its entire length with annular grooves normal to the axis, wherein the plastic material is moved in the circumferential direction of the conveying member. The roll shaped member rotates with a slight play in a horizontal cylindrical housing, while a feed roll fills the annular grooves. In the individual grooves tangentially located strippers are arranged, which remove the plastic material at the outlet from the roll and the grooves. Even though this rotary press teaches a configuration in which a screw is no longer used as the pressure generating and material transport element, this principle of construction has been unable to displace the screw press.

SUMMARY OF THE INVENTION

It is an object of the present invention to provide an improved press of the aforementioned type.

It is another object of the invention to provide an extrusion press of this type which is capable of operating without a pressure screw.

A further object of the invention is to provide such a press with which the extrusion of a plastic blank with a planar feed of the material, with respect to the axis of the blank, can be carried out continuously, without a helical texture and internal twisting.

In accomplishing the foregoing objects, there has been provided in accordance with the present invention a press for the preparation of plastic blanks, in particular unfinished ceramic shapes for insulators, comprising a feed device for a plastic material; a rotor housing connected to the feed device; a circular rotor eccentrically supported in the rotor housing for the generation of pressure and the transport of the plastic material, this rotor being equipped with at least one axially extending material transport ridge; and a guide rail for positively guiding the material transport ridge. The press further comprises an outlet cross section for the plastic material between the circular rotor and the rotor housing, offset by approximately 90° with respect to the highest eccentricity of the circular rotor, and a nozzle located essentially normal to an outlet sector, defined on the lower side by the outlet cross section.

With the new press not only are the objectives attained in an advantageous manner, but also a press largely free of failure is provided. The rotor together with the transport ridges simultaneously transports and precompresses the plastic material without the formation of S-shaped textures in the cross section of the plastic shapes. Such textures are particularly unacceptable in cyclindrical ceramic blanks which are expected to satisfy high requirements. Accordingly, the new press provides a tool which also overcomes the disadvantages of the screw press, namely, high friction and thus a large consumption of energy, since friction at the surfaces of the circular rotor in contact with the plastic material is slight compared with friction in screw presses. This also holds true for fields of application wherein the S-shaped twisting of the blank due to transportation by a screw is not important. The press can be equipped without difficulty with a conventional vacuum enclosure, so that the problems of the deaeration of blanks of special quality do not occur.

Further objects, features and advantages of the invention will become apparent from the detailed description of preferred embodiments which follows, when considered together with the attached figures of drawing.

BRIEF DESCRIPTION OF THE DRAWINGS

In the drawings:

FIG. 1 is an axial cross-section of a press according to the invention in the form of a rotary vacuum press;

FIG. 2A is a longitudinal-sectional view of a nozzle of a press as shown in FIG. 1;

FIG. 2B is a view of the nozzle shown in FIG. 2A as seen from the larger end at 20; line "C—C" indicates the section visible in FIG. 2A;

DETAILED DESCRIPTION OF PREFERRED EMBODIMENTS

Figure 3:
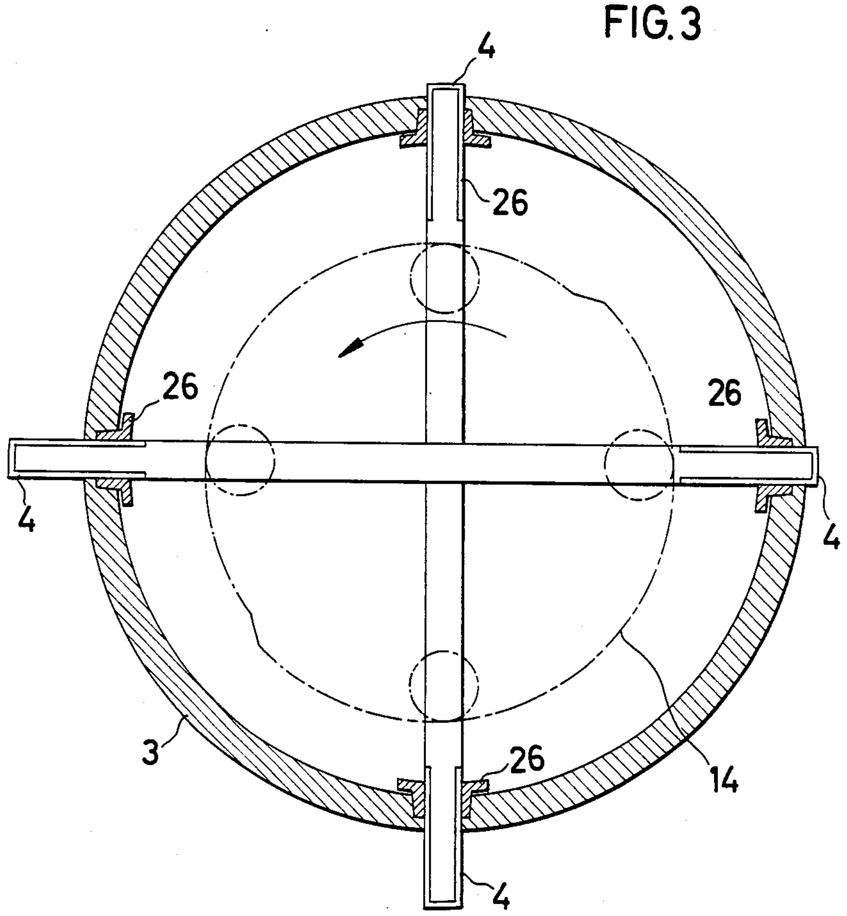
FIG. 3 is a cross-section through the circular rotor of the device according to the invention.

As in the prior art, feeding of the plastic material is effected by means of a feed screw 10 driven by an electric motor 18, wherein the feed screw 10 may be fed with the aid of a feed opening 9, (FIG. 1).

The feed screw is followed, as in the state of the art, by a slotted plate 11, wherein the plastic material is divided into slices or chips. The slotted plate 11 in combination with the layer of plastic mass covering it, primarily has the function to seal a subsequent vacuum enclosure 6 at the feed side. It is the purpose of a vacuum enclosure of this type to deaerate the chips dropping into it; in a case where undue dehydration of the plastic material occurs in the vacuum installation, a spray device (16) may additionally be provided.

The chips of the material arrive within the vacuum enclosure 6 at a feed roller 1, which feeds a circular rotor 3. The primary function of the feed roller 1 is to prevent an undesirable buildup of material within the vacuum enclosure 6.

In another embodiment of the present invention the press has no feed roller 1 and the material transport ridges 4 of circular rotor 3 are capable of sweeping the entire space of the vacuum enclosure 6, i.e. of touching the wall of the vacuum enclosure opposite the circular rotor. In this case the left wall (in FIG. 1) of the vacuum enclosure 6 is moved towards the axis of the rotor and connected directly with the lower part of housing 2.

The circular rotor 3 is supported eccentrically in the rotor housing 2. The rotor housing 2 is preferably cylindrical, but similar to known circular piston rotors, a different configuration of the rotor housing may be chosen, in which case the circular rotor with its conveying ridges are modified accordingly.

The circular rotor 3 has at least one material transport ridge 4, which is forcibly guided along a guide path or guide rail 14 in the rotor housing 2. In the simplest case, these material transport ridges 4 (at least one is required) are slides which move back and forth in the circular rotor, and if several material transport ridges 4 are used, they may have the configuration of rods of the arms of a maltese cross.

The eccentricity of the circular rotor 3 in the rotor housing 2 is such that a tapering channel is formed between the rotor and the housing. When viewed from the feed roller 1, a material transport segment 7 is formed between each two material transport ridges. The largest width of transport segment 7 is located opposite the feed roller 1, and the width tapers in the direction of an outlet cross section or extrusion gap 8A. The outlet cross section 8A is arranged so that it is located at about 90±30°, especially 90±10°, preferably 90+5° to the axis of greatest eccentricity of the circular rotor 3. The axis of greatest eccentricity runs from the center of the rotor to the point of the circumference of the rotor with the greatest distance to the corresponding part of the rotor housing. At the place of the highest eccentricity the ends of the transport ridges 4 get a maximum distance to the cylindrical surface of rotor 2.

In FIG. 1 the place of greatest eccentricity is marked 17. Said eccentricity and the position of the outlet cross section or gap (8A) determine the width of 8A. Thus, the outlet cross section desired is formed without any adjusting operation. However, by means of an adjustable outlet cross section slide 8 the width of said cross section may be reduced. It is obvious that the size of the outlet cross section or gap 8A is a factor in the compression of the chips of plastic material. Another factor is the material introduced by the feed screw 10 and the rpm of the circular rotor 3. It is advantageous if the ratio of the width of the tapering channel formed by rotor and rotor housing at the place of the highest eccentricity to the width at the place of the outlet cross section is at least 4:1. In this case it is guaranteed that the precompression in the tapering channel is sufficient and the mass transported within a single mass transport segment (7) can be small.

The outlet cross section or gap 8A opens into an outlet sector or opening 15. The outlet sector or opening 15 for the plastic mass is a polygonal, preferably rectangular, especially quadratic opening in the cylindrical housing. Attached to this opening 15 is a nozzle 5, which in FIG. 1 consists of parts 20, 21, 22 and 24.

These parts are described in more detail in connection with FIG. 2. Thus, as the plastic mass leaves outlet cross section 8A it enters nozzle 5. Opposite to cross section 8A but also between housing (2) and rotor (3) is a doctor blade (13). Doctor blade (13) at the upper end and cross section 8A at the lower end enclose the opening on the circumference of the rotor housing 2 which confines the outlet sector 15. In the outlet sector 15, the forcibly guided material transport ridges 4 spread the material delivered by the transport segment 7 laminar in the layer thickness desired, thus adding again and again thin layers of plastic mass to the mass within outlet sector (15).

It is advantageous if the ratio of the area of the profile of the outlet sector (15) to the area of the profile of the outlet cross section or gap (8A) is at least 50:1. Thereby it is guaranteed that the compression of the plastic mass within the outlet sector (15) is great enough and the thickness of the layer of plastic material spread onto the mass within (15) is thin enough.

As already mentioned, outlet sector 15 is enclosed by nozzle 5 in which a cylindrical blank of plastic material is formed. The precompressed material is spread in a laminar manner as a function of the size of the transport segment 7. The greater the quantity of the material supplied per material transport segment 7 the greater the thickness of the layer added.

The use of nozzles is conventional. In cooperation with the circular rotor 3 a nozzle 5 is advantageous, which is capable of taking into account the specific characteristics of the shaped blank formed within outlet sector 15. The nozzle is shown in FIGS. 2A and 2B. As round blanks are desired for use in the ceramic industry for the production of insulators mostly round blanks are produced in nozzle 5 of the press of the instant invention. However, it is clear that any other shape of blanks may be produced, depending on the intended use. Nozzle 5 contains a transitional part 20 having a polygonal, preferably rectangular, especially quadratic, inlet and a round outlet. Part 20 is connected directly to the rotor housing 2 and is adapted to the opening of outlet sector 15. The transition from the polygonal part which is in the form of a funnel to the round part is effected with a slope of the flank of at least 30° to the axis of the nozzle. The polygonal part of 20 is advantageously very short and is significantly shorter than the subsequent round part 21. To part 20 is attached a texture centering part 24 which is rotatable and has a sickle shaped forming segment 25 attached to the inside, to guide the centered texture configuration. Centering part 24 is followed by a long round part 21. To the round part 21 there is attached a conical funnel 22 the opening of which defines the diameter of the plastic blank leaving the press. However, centering part 24 may be deleted if the pattern of the texture of the plastic blank is unimportant.

It is advantageous if the axis of nozzle 5 is located essentially normal to the circumference of the rotor 3. It is further advantageous if this axis of the nozzle is located symmetrical in relation to the outlet sector 15, i.e. has an equal distance to doctor blade 13 and to outlet cross section 8A.

The cross section of the plastic blank that is taken off at the end of nozzle 5 has a centered texture pattern, and not the undesired S shaped texture caused by a screw press. Furthermore, this plastic blank may be produced with a minimum consumption of energy, since the detrimental frictional conditions known in the case of screw presses do not exist.

The press can be further improved in an advantageous manner by additional features. As mentioned above, the material transport ridges can be guided forcibly along the rotor housing 2, in order to guarantee a definite distance between the ends of the transport ridges 4 and the inner wall of the rotor housing. This may be effected by means of a guide rail 14 in the frontal walls of the rotor housing 2. (FIG. 3). In a very general manner, the material transport ridges 4 can be forcibly guided along a guide rail 14, which may also be arranged inside the circular rotor 3 correspondingly with the rotor housing 2. Because the material transport ridges 4 can move back and forth in the circular rotor in keeping with its eccentricity, it is appropriate to provide a seal 26 between the material transport ridges 4 and the circular rotor, in order to prevent depositing and penetrating of plastic material. As an additional measure, it may be advisable, especially if abrasive ceramic material is used, e.g. plastic ceramic material containing from 25 to 45% of hard $Al_2O_3$, to line the inside of rotor housing 2, which belongs to the above mentioned tapering channel and along which the material transport ridges 4 slide, with abrasion resistant materials. This side is an area of high wear and marked 12 in FIG. 1. Also the ends of the ridges 4 may be lined with an abrasion resistant material.

The doctor blade 13 removes from the circular rotor 3 the residual plastic material after the spreading to the outlet sector 15. It is advantageous if the doctor blade 13 automatically adjusts itself in response to the back-pressure prevailing in the nozzle, so that any wear in the operation of the press may be equalized. This is for example the case if the doctor blade 13 fits into the V-shaped aperture formed by rotor housing and rotor and is pressed into this aperture by the plastic material.

A spring action material pressuring device 19 assures that returning material residues remain adhering to the rotor and the area of the material transport ridges. The uncontrolled exit of such residues into the vacuum enclosure 6 is thereby prevented. In the simplest case, a plate extending tangentially in an area to the circle defined by the transport ridges may be used for this purpose.

What is claimed is:

1. Press for the preparation of plastic blanks, in particular unfinished ceramic shapes for insulators, comprising:

a feed device for a plastic semi-solid material;

a generally cylindrical rotor housing connected to said feed device;

a circular rotor eccentrically and rotatably supported in said rotor housing for the generation of pressure and for transporting the plastic material, said rotor housing and said rotor forming a tapering channel therebetween, and said rotor including at least one axially extending and radially reciprocatable material transport ridge for contacting said rotor housing at least in said tapering channel upon rotation of said rotor, said channel defining a constricted extrusion gap for the plastic material at the smaller end of said channel, and said channel opening into means defining an outlet passage for the plastic material, said outlet passage defining means having (i) a polygonal outlet duct attached to the housing defining a polygonal opening in the housing, said polygonal opening defining a plane which is oriented substantially tangentially with respect to said rotor, and (ii) an outlet nozzle which is attached downstream of said outlet duct and is generally coaxial with said polygonal outlet duct;

means, including the at least one material transport ridge in combination with said polygonal opening, for spreading the plastic material coming from said tapering channel in laminar layers upon plastic material in the polygonal opening; and means, including a guide rail associated with at least one of said housing and said rotor, for radially reciprocating said at least one material transport ridge in response to rotation of said rotor to provide said contact with said rotor housing.

2. A press according to claim 1, wherein the extrusion gap for the plastic material between the circular rotor and the rotor housing is offset by approximately 90° with respect to the point at which circular rotor is separated the greatest distance from said rotor housing.

3. Press as claimed in claim 1, wherein the ratio of the width of the tapering channel formed by said rotor and said rotor housing at the point of greatest separation therebetween to the width at the place of the extrusion gap is at least 4:1.

4. A press according to claim 2, further comprising means for adjusting the width of the extrusion gap.

5. A press according to claim 1, wherein said material transport ridges are formed by at least one slide guided by the circular rotor.

6. A press according to claim 5, wherein the material transport ridges are supported sealingly in the circular rotor.

7. A press according to claim 1, wherein the inside of the rotor housing is lined with an abrasion resistant material.

8. A press according to claim 2, further comprising a doctor blade arranged at the upper end of the outlet sector.

9. A press according to claim 2, wherein the nozzle comprises a transitional part having a polygonal inlet attached to said rotor housing and a subsequent round outlet, wherein the polygonal part is in the form of a funnel having a flank slope of at least about 30°.

10. A press according to claim 1, further comprising a vacuum enclosure between the circular rotor and the feed device, and a feed roller located in the vacuum enclosure for feeding material to the circular rotor, said feed roller being aligned in the housing along an axis parallel with the axis of the rotor.

11. Press according to claim 1, further comprising a vacuum enclosure between the circular rotor and the feed device wherein the material transport ridges are arranged to touch said enclosure.

12. A press according to claim 8, further comprising means for causing returning material residues following said doctor blade to remain adhered to the rotor.

13. Press, as claimed in claim 9, wherein the nozzle is rotatably mounted with respect to said rotor housing and includes means, comprising a restriction extending partially around an inner surface defining said nozzle, for centering the textural configuration of the plastic material discharged into said nozzle through said extrusion gap.

14. Press according to claim 8, wherein the doctor blade is V-shaped and fits into and is pressed by the plastic material into a V-shaped aperture formed by rotor housing and rotor.

15. Press as claimed in claim 1, wherein the ratio of the area of the extrusion gap to the area of the polygonal opening is at least 50:1.

16. A press according to claim 1, wherein said feed device comprises a screw conveyor.

17. Press, as claimed in claim 1, wherein the axis of the outlet nozzle extends through and at a right angle with the central axis of said rotor.

* * * * *